United States Patent
Yangüela et al.

(10) Patent No.: US 9,002,205 B2
(45) Date of Patent: Apr. 7, 2015

(54) SYSTEM FOR LONG REACH XDSL OVER FIBER

(75) Inventors: Manuel Sanchez Yangüela, Madrid (ES); Pablo Alberto Yagüe Valentin, Madrid (ES)

(73) Assignee: Telefonica, S.A., Madrid (ES)

( * ) Notice: Subject to any disclaimer, the term of this patent is extended or adjusted under 35 U.S.C. 154(b) by 107 days.

(21) Appl. No.: 13/995,018

(22) PCT Filed: Dec. 19, 2011

(86) PCT No.: PCT/EP2011/073222
§ 371 (c)(1),
(2), (4) Date: Jul. 29, 2013

(87) PCT Pub. No.: WO2012/080512
PCT Pub. Date: Jun. 21, 2012

(65) Prior Publication Data
US 2013/0302030 A1    Nov. 14, 2013

(30) Foreign Application Priority Data
Dec. 17, 2010  (ES) .................................. 201031875

(51) Int. Cl.
*H04J 4/00* (2006.01)
*H04J 14/02* (2006.01)
*H04Q 11/00* (2006.01)
*H04B 10/00* (2013.01)

(52) U.S. Cl.
CPC ........ *H04J 14/0227* (2013.01); *H04Q 11/0067* (2013.01); *H04Q 11/0071* (2013.01)

(58) Field of Classification Search
CPC .................................................. H04J 14/0298
USPC .......................................................... 398/76
See application file for complete search history.

(56) References Cited

U.S. PATENT DOCUMENTS

| 2004/0264683 A1* | 12/2004 | Bye ................................ 379/402 |
| 2006/0188259 A1* | 8/2006 | Furey .............................. 398/71 |
| 2007/0147838 A1* | 6/2007 | Kim et al. ........................ 398/72 |

FOREIGN PATENT DOCUMENTS

| CA | 2353594 | 1/2002 |
| CA | 2346573 | 11/2002 |
| WO | WO 02/45383 | 6/2002 |

OTHER PUBLICATIONS

International Search Report issued for PCT International Application No. PCT/EP2011/073222, mailed on Feb. 20, 2012.

*Primary Examiner* — Daniel Dobson
(74) *Attorney, Agent, or Firm* — Pearl Cohen Zedek Latzer Baratz LLP

(57) ABSTRACT

System for connecting a plurality of digital subscribers to a data network, comprising a local part connected, by an optical fiber link, to a remote part. Said local part comprises a plurality of DSLAM line cards with xDSL over fiber transceiver that, in turn, comprise a plurality of xDSL lines comprising a modified analog front end which comprises an digital-analog converter to transform a transmitted digital downstream signal into an analog downstream signal; an oscillator which fixes an oscillation frequency for the xDSL line; a mixer, directly connected to the output to convert the analog downstream signal into the oscillation frequency; and a band pass filter centered at the oscillation frequency which filters the converted analog downstream signal. And in upstream direction: a band pass filter centered at the oscillation frequency which filters an analog upstream signal; an oscillator which fixes an oscillation frequency for the xDSL line; a mixer, directly connected to the output of the band pass filter to convert the analog downstream signal into the original frequency; a low pass filter to avoid aliasing; an analog front end which comprises an analog-digital converter to transform the converted analog upstream signal into a digital upstream signal.

8 Claims, 11 Drawing Sheets

SYSTEM FOR LONG REACH XDSL OVER FIBER

CROSS-REFERENCE TO RELATED APPLICATIONS

This application is a National Phase Application of PCT International Application No. PCT/EP2011/073222, International Filing Date Dec. 19, 2011, which claims priority of Spanish Patent Application No. P201031875, filed Dec. 17, 2010, both of which are hereby incorporated by reference.

FIELD OF THE INVENTION

The present invention relates to data networks more specifically to the connection by means of optical fiber and service to digital subscribers.

BACKGROUND OF THE INVENTION xDSL technologies are the most widespread broadband technologies. These technologies, which comprises, for example ADSL, ADSL2, ADSL2+ or VDSL2 use Telco's copper access networks to provide broadband connectivity. xDSL signals are transmitted over metallic pairs from a Central Office to customer premises as it is shown in FIG. 1.

The downstream traffic, from the network to end users is aggregated by de DSLAM (Digital Subscriber line Access Multiplexer) 1, where there are several xDSL DSLAM line cards 2, and transmitted to the CPE (Customer Premises Equipment) 4 located at customer premises 19 over a metallic pair 11. The upstream traffic, from the end user to the network is collected by the CPE 4 and transmitted over a metallic pair 11 to the DSLAM 1 which typically is located at a Central Office 17 (FIG. 1) but it can also be located out that point, in a remote node 18 (FIG. 2).

The xDSL signals share the metallic pair 11 with voice signal from the PSTN (Public Switched Telephone Network) service. In order to share the metallic pair 11 spectrum, splitters 14a and microfilters 14b are used. For each metallic pair, there is a splitter 14a at the Central Office 17 or at the Remote Node 18 (see FIG. 2) side, and there is either a splitter 14a or microfilter 14b at the customer premises side. Voice splitters 14a and microfilters 14b divide/combine the xDSL and voice signals. The voice signal is exchanged between the PSTN switch 16 at the Central Office 17, and the telephone 15 at customer premises 19. In case of FTTN (Fiber To The Node) deployments (FIG. 2), the PSTN switch 16 can be located at Central Office 17 or if it a small one, it can be located at the remote node 18.

Splitters 14a and microfilters 14b are only required in case that voice services are provided using circuit switching technology. But the voice service can also be provide by means of VoIP (Voice over IP) using packet switching technology. In case of VoIP voice services, splitters 14a and microfilters 14b are not required.

xDSL technologies provide broadband access over existing metallic (typically copper) pair access network. But there are some constraints for these technologies:

Metallic pair attenuation. This attenuation increases with the length of the pair. That means that the SNR (Signal to Noise Ratio) decreases as metallic pair length increase. So, in order to keep the BER (Bit Error Rate) below a maximum threshold, the bitrate provided by xDSL decreases as the metallic length increases.

Crosstalk, a disturbing signal which appears when there are several xDSL links over metallic pairs that share the same cable or binder. These parasitic signals appear due to capacitive and inductive coupling between adjacent pairs. Crosstalk signals increase significantly the noise level and thus reduce significantly the SNR of the received xDSL signal in the disturbed pair.

Noise: transient signals electromagnetically coupled which appears randomly and creates burst errors.

These constraints involve that using xDSL for broadband access, the access bit rate cannot exceed a net bitrate of 6-8 Mbit/s beyond 2.5 km away from Central Office, depending on wire gauges and pair isolation.

The introduction of fiber into the local loop, replacing partially or completely the metallic pair improves significantly the xDSL performance due to the low attenuation of fiber and its electromagnetic immunity which avoids crosstalk and noise problems. That is the reason why some Telcos has deployed FTTN xDSL access networks, following the scheme shown in FIG. 2. This solution introduces the fiber into the aggregated link between the DSLAM 1 located at the Remote Node 18 and the Central Office 17. This approach allows using short metallic pairs between each DSLAM 1 port 3 and each CPE 4. So the attenuation and crosstalk levels decrease and the noise risk also decreases. The FTTN approach could permit to extend both the coverage and the bitrate of broadband access. But it is a very expensive approach because to achieve such goal, it would be necessary to deploy a lot of remote DSLAMs which is very expensive both in capital and operation, apart from other important issues like DSLAMs feeding and the location problem that can be more complex than the base stations or Node B location for mobile services. Some patents propose solutions of this kind.

Some alternative solutions can be found looking at the patents WO0245383 A2 "Apparatus for connecting digital subscriber loops to central office equipment", CA2346573 A1 "Arrangements for connecting digital subscriber loops to central office equipment", CA2353594 A1 "Extended distribution of ADSL signals" or US2004264683 A1 "Hybrid Access Networks and Methods".

But these solutions entail some other problems as looking for sites to locate the Remote Nodes 18, either in the street or in buildings; managing and monitoring remotely the equipments, the DSLAMs 1, located at the Remote Nodes 18; or remote powering of a fully equipped DSLAMs 17 located out of Central Office 17 premises.

SUMMARY OF THE INVENTION

The present invention solves the aforementioned problems by disclosing a system which provides an improvement of existing systems. Present invention considers the modification of current DSLAM line cards, with an optoelectronic transceiver required to transport xDSL signals over optical wavelengths included into DSLAM line cards and a simplification of the typical Analog Front End, thus the resulting modified card does not require any hybrids or solid state hybrids transformers to combine/split downstream and upstream xDSL signals because multiplex are created over the fiber before transmission over metallic pairs and the 2 wires conversion is not needed.

According to a first aspect of the invention, a system for connecting a plurality of digital subscribers to a data network is provided. Digital subscribers send analogue upstream signals to the data network and the data network sends digital downstream signals to the digital subscribers. The system comprises a local part, located at a central office, connected by an optical fiber link to a remote part, located at an intermediate place between the central office and the digital subscribers. Said local part further comprises a plurality of digital subscriber line access multiplexer line cards with xDSL over fiber transceiver, and said digital subscriber line access multiplexer line cards with xDSL over fiber transceiver comprises:

a plurality of xDSL lines comprising:
  in downstream direction:
    an analog front end which comprises an digital-analogue converter to transform a transmitted digital downstream signal into an analogue downstream signal at a original frequency and at least one amplifier;
    an oscillator which fixes an oscillation frequency for the xDSL line;
    a mixer, directly connected to the output of the at least one amplifier to convert the analog downstream signal into the oscillation frequency;
    a band pass filter centered at the oscillation frequency which filters the converted analog downstream signal;
  in upstream direction:
    a band pass filter centered at the oscillation frequency which filters an analogue upstream signal;
    an oscillator which fixes an oscillation frequency for the xDSL line;
    a mixer, directly connected to the output of the band pass filter to convert the analogue downstream signal into the original frequency;
    a low pass filter to avoid aliasing
    an analogue front end which comprises an analogue-digital converter to transform the converted analogue upstream signal into a digital upstream signal, and at least one amplifier;
  an adder circuit to combine the analogue downstream signals received from each xDSL line;
  an optical upconverter centered at a downstream wavelength, directly connected to the output of the adder, and the output of said optical upconverter is delivered to a wavelength division multiplexer;
  an optical downconverter centered at an upstream wavelength, directly connected to a wavelength division multiplexer;
  a wavelength division multiplexer which is connected through a point to point single model fiber to the remote part.

The system of the invention has an oscillator for each xDSL line. Said oscillator fixes an oscillation frequency for each xDSL line higher Δf than the previous one, being Δf:
  Δf>1.014 Mhz for ADSL and ADSL2;
  Δf>2.208 MHz for ADSL2+;
  Δf>30.000 MHz for VDSL2;

According to a second aspect of the invention, the system of the invention includes a terminal unit into the remote part establishing a link between a port at the digital subscriber line access multiplexer and said terminal unit for remote monitoring using monitoring facilities of xDSL Operation, Administration and Maintenance mechanisms.

Finally, the system can include optionally some elements to introduce wavelength division multiplexing in xDSL over fiber. That is:
  including a plurality of switches to assign the xDSL lines to the wavelength pairs and a switch control module implemented to control said plurality of switches.
  including a block in the data network to transport a first additional wavelength for digital television distribution and a second additional wavelength for an optical outside plant supervision, said block comprises:
    a wavelength division multiplexer to split wavelengths for xDSL transport from additional wavelengths;
    a cyclic Arrayed Waveguide Grating connected to the wavelength division multiplexer to split the wavelengths for xDSL transport into a plurality of output fibers;
    a passive splitter connected to the wavelength division multiplexer to divide the optical power of the wavelengths used for additional wavelengths into a plurality of output fibers;
    a plurality of wavelength division multiplexer couplers connected to the cyclic Arrayed Waveguided Grating and the passive splitter to combine at each output fiber the wavelength pair for xDSL transport with the additional wavelengths;
  including in the remote part an Automatic Wavelength Locking module which receives a signal injected in the local part and transmitted through the cyclic Arrayed Waveguide Grating to an automatically tuning of the assigned wavelengths used for the transmission.

To conclude with the advantages of present invention it is appropriated to point out that it means an improvement of actual systems providing an increase of the optical budget of 3 dB, which is a coverage radius increase comprised between 3.5 Km and 5 Km. The coverage increase provided by current proposal permits a drastic reduction of the number of Central Offices 17 in high-population urban areas by a factor of thirty. Proposed invention could provide a minimum net access bitrate of 10 Mbit/s up to 20 km away from Central Offices 17.

Current invention permits the transport of multiple xDSL multiplexed over different wavelengths in the same fiber, using a different pair of downstream and upstream wavelengths for each xDSL multiplexed.

In case of multiple wavelength pairs for xDSL signals transport, the system may include a module which permits an automatic tuning to the corresponding wavelength.

Current invention may includes a mechanism for the remote monitoring of the xDSL over fiber links.

And current invention includes a mechanism which permits the coexistence in the optical distribution network of different wavelength pairs for xDSL transmission, digital television transport and optical outside plant monitoring.

For a more complete understanding of the invention, its objects and advantages, reference may be had to the following specification and to the accompanying drawings.

BRIEF DESCRIPTION OF THE DRAWINGS

For the purpose of aiding to better understand the characteristics of the invention according to a preferred practical embodiment thereof and in order to complement this description, the following figures are attached as an integral part thereof, having an illustrative and non-limiting character.

DETAILED DESCRIPTION OF THE INVENTION

In present invention, xDSL signals are transmitted over a fiber in order to improve coverage and access bitrate provided by xDSL access technologies. The usage of fiber drastically reduces the attenuation and crosstalk, and improves noise resilience. All these factors improve significantly xDSL performances: bitrate and coverage.

The system proposed introduces fiber in the loop, providing the maximum performance increase in both bitrate and coverage, while minimizing the impact in currently deployed xDSL access infrastructure. The only change required is focused on DSLAM line cards 2, while currently deployed xDSL Customer Premise Equipment 4 (CPE from now on) are kept without any change. The proposal assumes the replacement of legacy voice services based on circuit switching technology by Voice over IP (VoIP) services, as it is been doing now with fiber access based on GPON solutions. That is the reason why voice splitters 14a and microfilters 14b are no longer required in the xDSL links considered in present invention.

Figure 1:
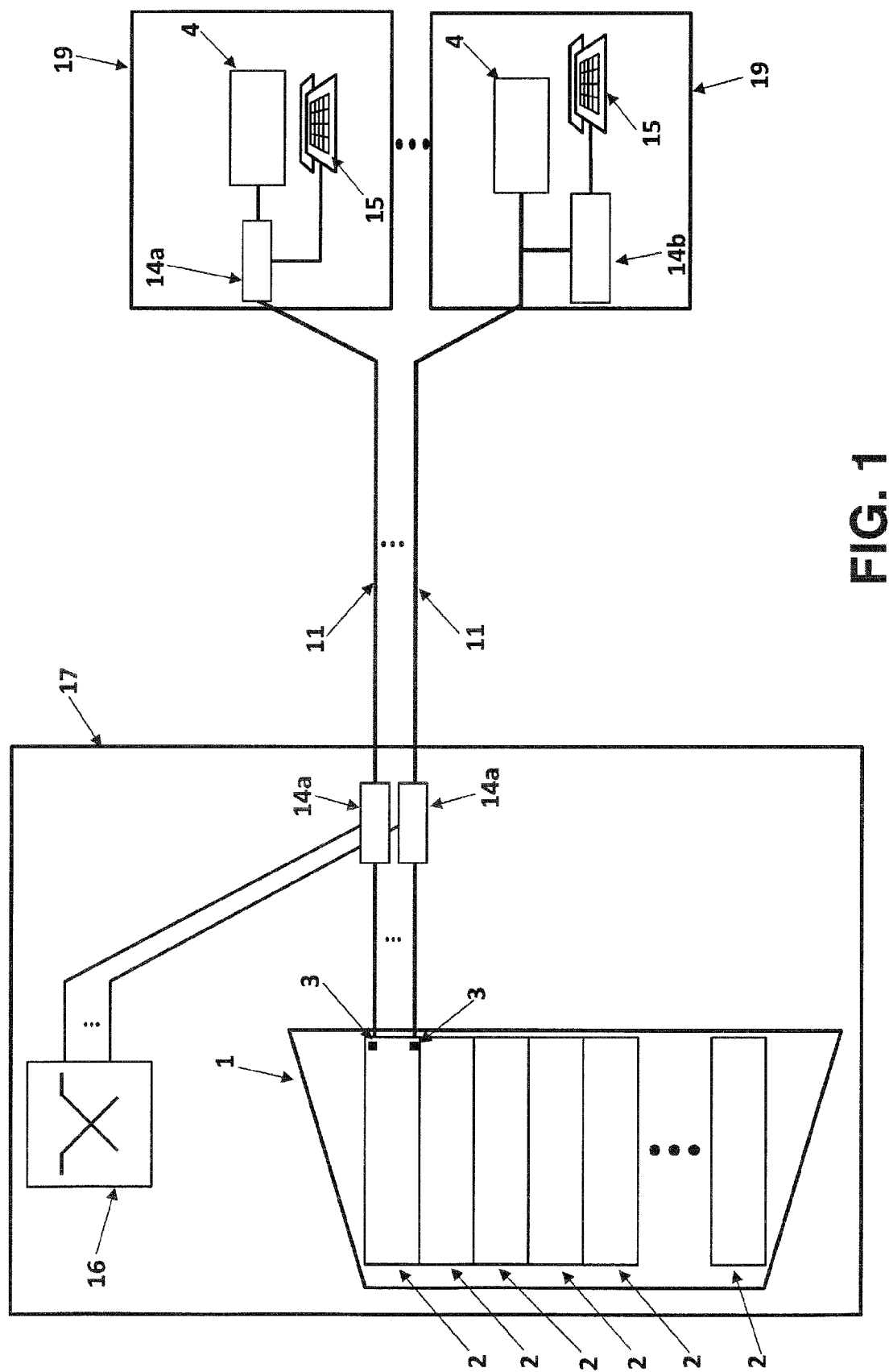
FIG. 1 shows a diagram of xDSL access deployed from a central office in the prior art.
Figure 2:
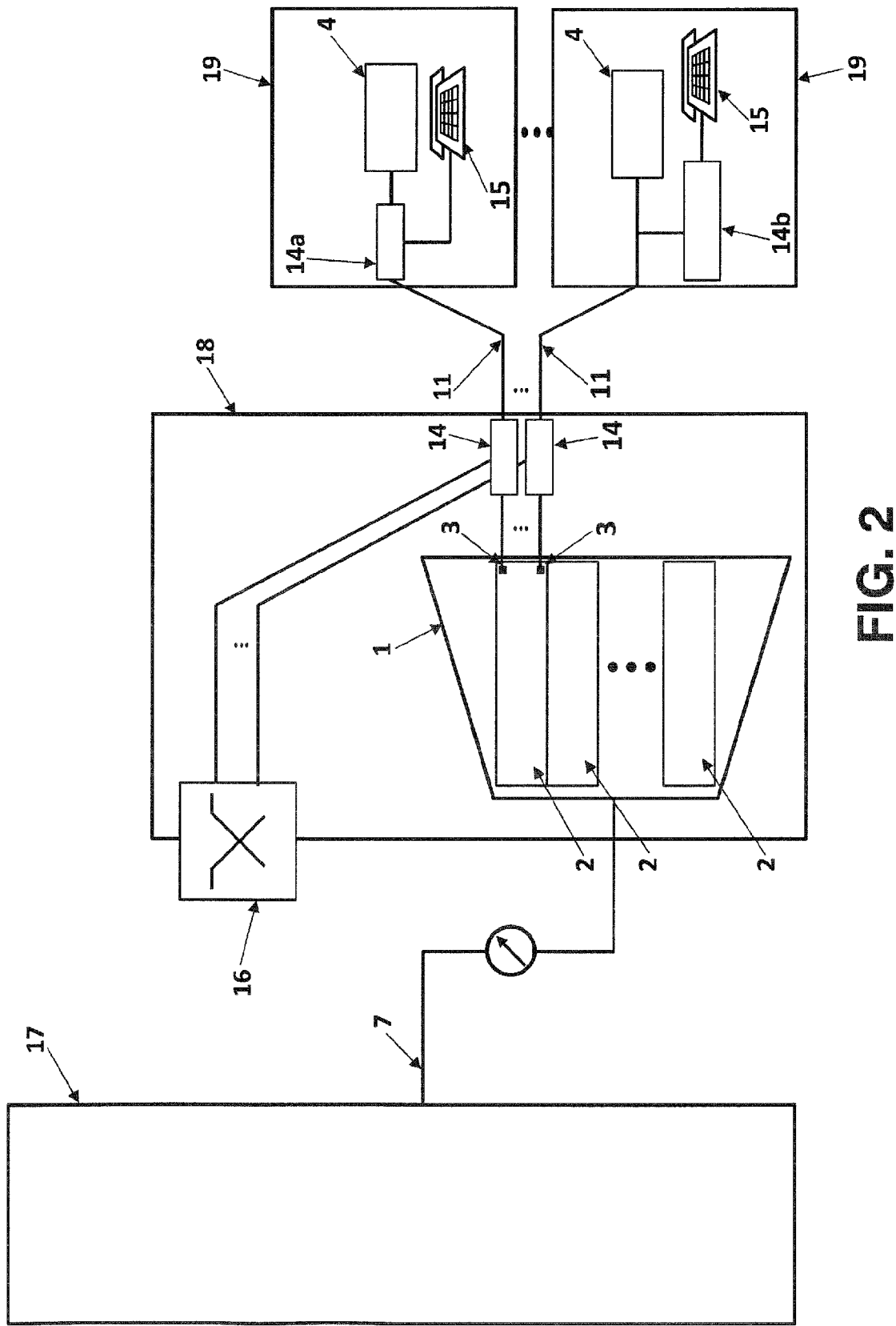
FIG. 2 shows a diagram of xDSL access deployed from a remote node in the prior art.
Figure 3:
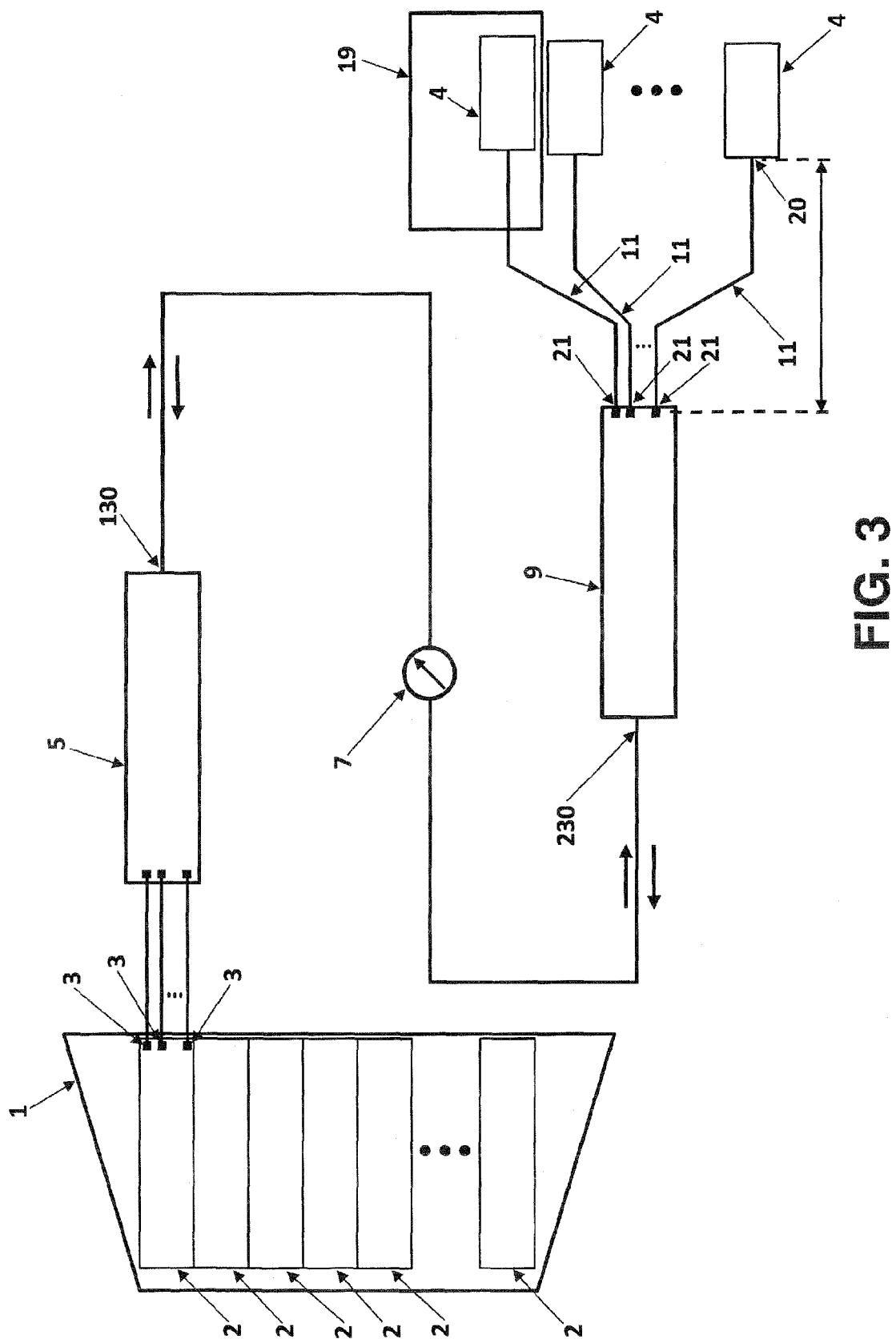
FIG. 3 shows a diagram of xDSL over fiber approach of the prior art.

Some patents propose solutions, as presented in FIG. 3, consisting of an optoelectronic module, that it is called from now on xDSL over Fiber transceiver—Central 5, hosted in a local part. This optoelectronic module 5 is connected through a point to point Single Mode Fiber (SMF) 7 to a remote optoelectronic module that it is called from now on xDSL over Fiber transceiver—Remote 9 closely located to Customer Premises 19. The remote part, can be located in the street near the building or even inside the building which is served.

Figure 4:
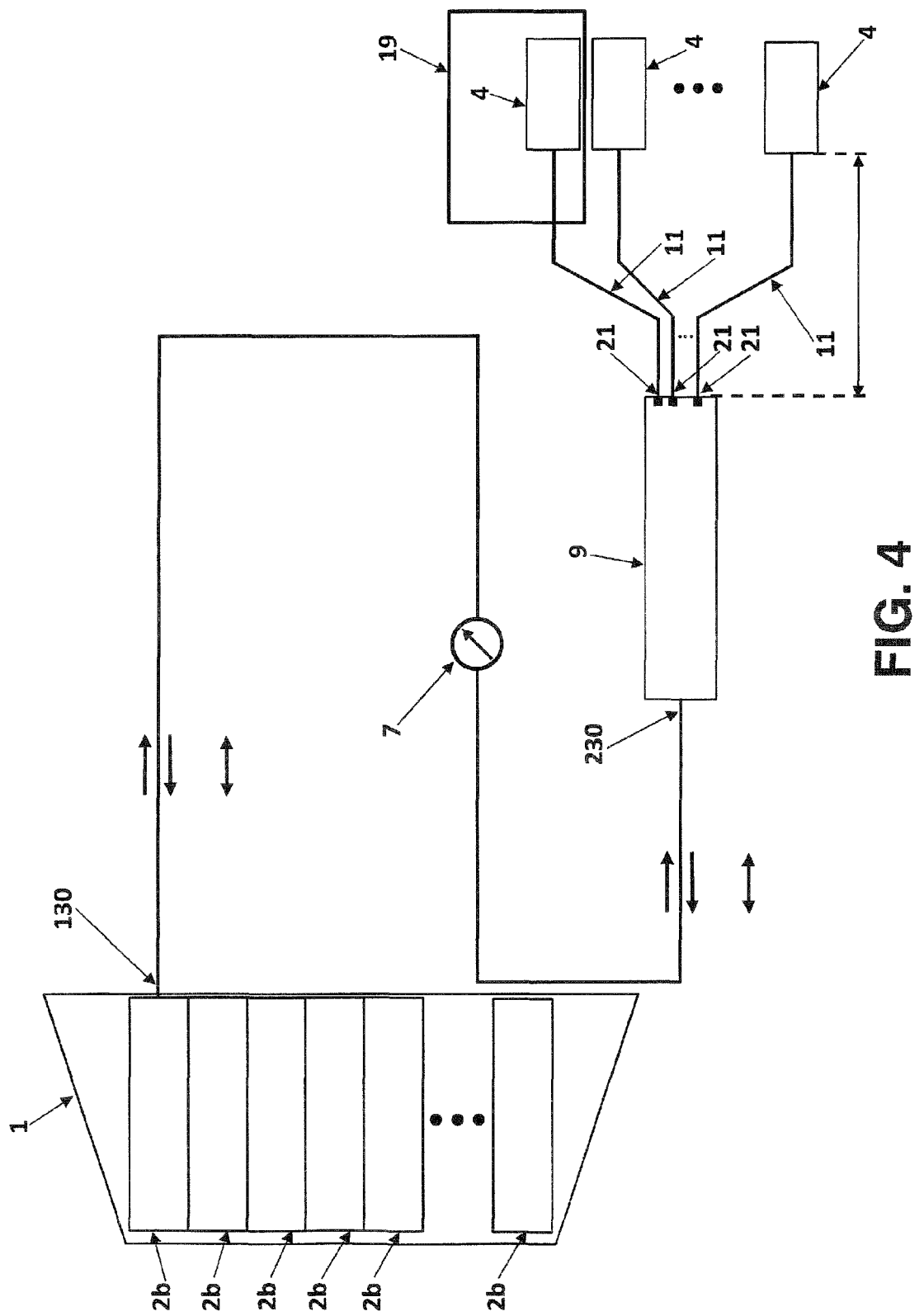
FIG. 4 shows a diagram of xDSL over fiber with an integrated xDSL over fiber transceiver—central into DSLAM line cards.

Present invention includes the xDSL over Fiber transceiver—Central 5 into the DSLAM line card 2 So the xDSL over fiber scheme is the one shown in FIG. 4.

The present invention includes a simplification of the Analog Front End 13 (AFE from now on) in the xDSL over fiber Transceiver—Central 5.

Figure 5:
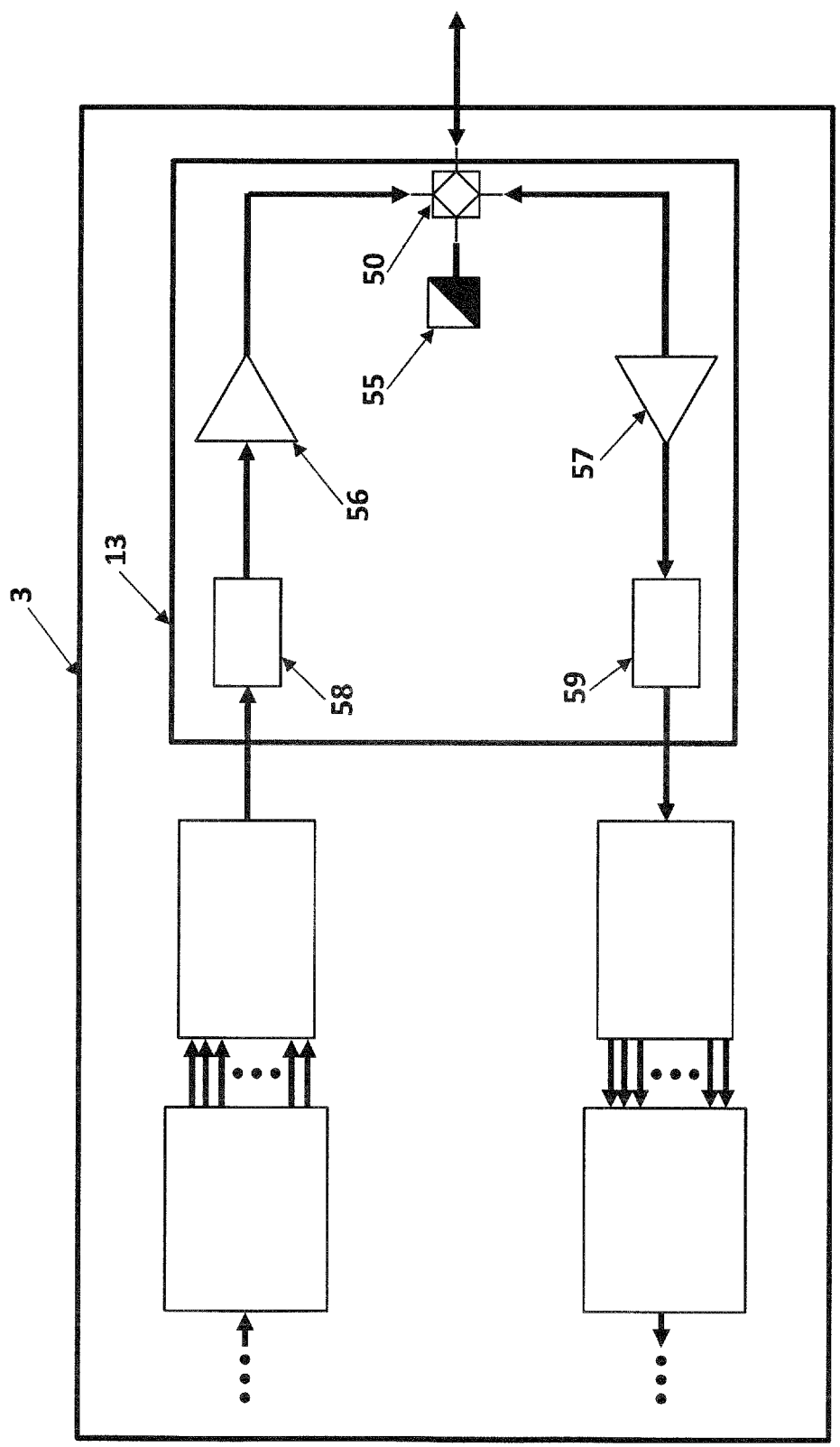
FIG. 5 shows a block diagram of a current xDSL port in a DSLAM line card.

A typical AFE 13 of an xDSL DSLAM port 3 is shown in FIG. 5. The typical AFE 13 consists of a DAC (Digital to Analog Converter) 58 which transforms the transmitted digital downstream signal into an analogue signal, an ADC (Analog to Digital Converter) 59 which transforms the upstream analogue signal into a digital one, and an hybrid 50 with a matched load 55 used for 2-4 wires conversion.

The improvement consists of an AFE 13b with no hybrid 50. The hybrid is no longer needed because of the 2-4 wires conversion does not take place in the local part of the invention. This makes a difference with previous patents.

Previous patents use xDSL signals which are sent to the subscribers over a metallic pair in a 2 wires transmission. Thus, an hybrid was required in the local part for splitting signals transmitted in both directions, sharing the spectrum, in order to transmitting the signals coming from the fiber in a 4 wires transmission. However, present invention works on xDSL signals before sending them to the metallic pair, generating a multiplex of signals which are transported by optical carriers in different wavelengths, upstream and downstream. There is a multiplex of signal transmitted by an upstream wavelength and a multiplex of signals transmitted by a downstream wavelength. Both are sent in a 4 wires transmission over a single mode fiber which connects the local part and the remote part. The hybrid is no needed since there is not any 2 wires conversion in the local part. In the remote part an hybrid it is required for the 2-4 wires conversion as usual, but hybrid suppression in the local part adds three additional decibels to the optical link power budget. This increment in the optical link power budget means a coverage radius increase comprised between 3.5 and 5 km, while keeping constant the access bit rate.

The elements shown in FIG. 4 combine and split the N xDSL links in the following way:

The DSLAM Line card with xDSLoF transceiver—Central 2b included in DSLAM 1, multiplexes N xDSL downstream signals and transport it by means of FDM (Frequency Division Multiplexing) using a wavelength $\lambda_{DOWN}$. At the same time it demultiplexes N xDSL upstream signals received by means of a FDM signal carried by a wavelength $\lambda_{UP}$.

The xDSL over Fiber transceiver—Remote 9 close to Customer Premises 19, multiplexes the N xDSL upstream signals from N CPEs 4 into an unique FDM signal transported by a wavelength $\lambda_{UP}$. And at the same time it demultiplexes the N xDSL downstream signals received by means of a FDM signal carried by a wavelength $\lambda_{DOWN}$.

Figure 6:
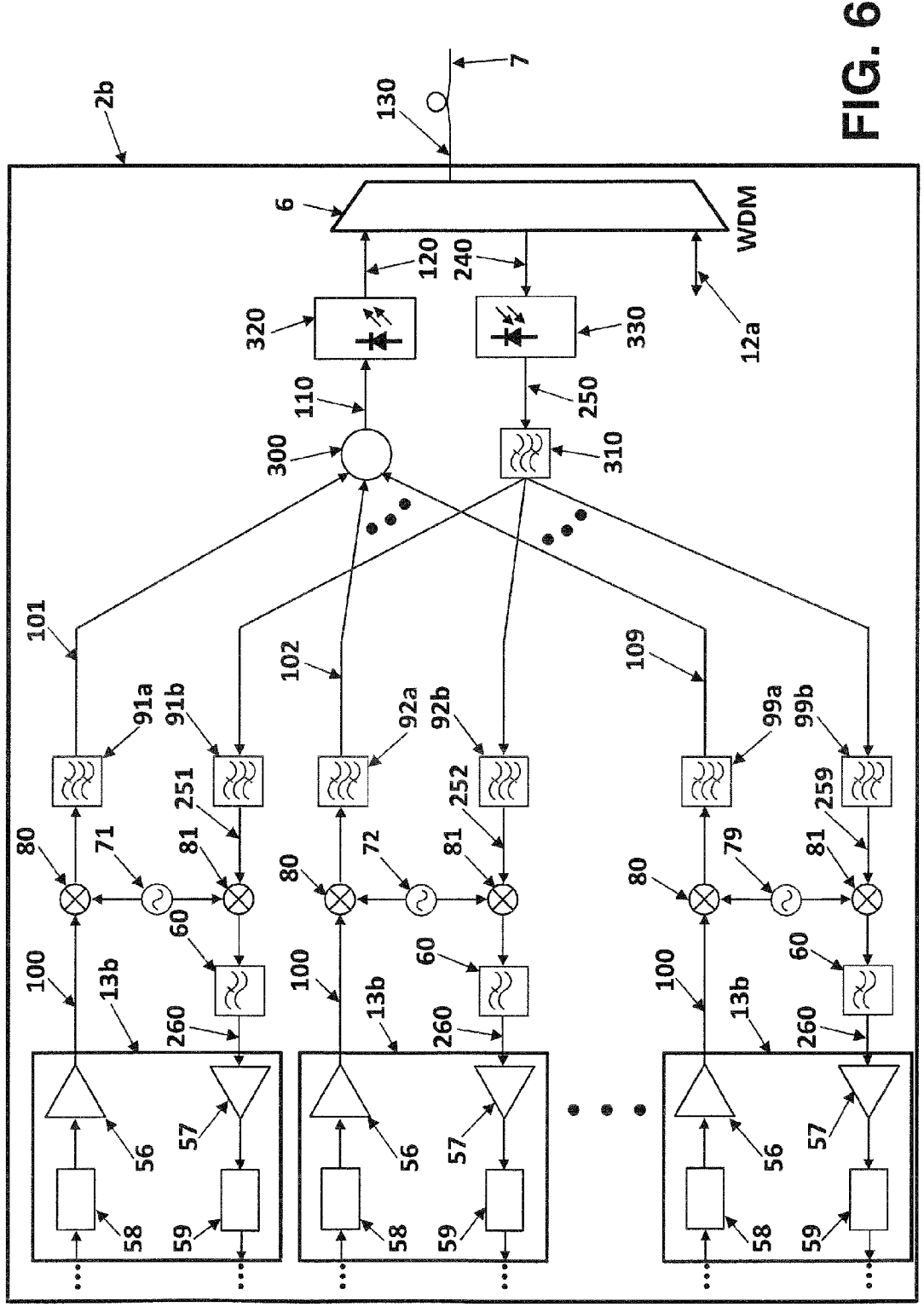
FIG. 6 shows a block diagram of the DSLAM line card with xDSL over fiber transceiver—central.

The xDSLAM Line card with xDSL over Fiber transceiver—Central 2b block diagram is shown in FIG. 6. Each xDSLAM Line card with xDSL over Fiber transceiver—Central 2b handles N xDSL lines. The N digital xDSL downstream signals are injected into their corresponding simplified AFE 13b meanwhile the N digital xDSL upstream signals are extracted from their corresponding simplified AFE 13b. The analog downstream xDSL signal 100 is upconverted by a mixer 80. For each xDSL line there is a local oscillator (71 for the first xDSL line, 72 for the second one, and so forth, 79 for the N-th and last xDSL line). The oscillation frequency of each of the N oscillators is $\Delta f$ Hz higher than the previous one and $\Delta f$ Hz lower than the next one. The frequency band $\Delta f$ must be large enough to span the xDSL spectrum, including both upstream and downstream, and also a band guard. So:

$\Delta f > 1.104$ MHz for ADSL (ITU-T G.992.1) and ADSL2 (ITU-T G.992.3).

$\Delta f > 2.208$ MHz for ADSL2+ (ITU-T G.992.5).

$\Delta f > 30.000$ MHz for VDSL2 (ITU-T G.993.2)

So $f_0$ is the oscillation frequency of oscillator 71, $f_0 + \Delta f$ is the oscillation frequency of oscillator 72 and so forth, $f_0 + (N-1) \cdot \Delta f$ is the oscillation frequency of oscillator 79. The output signals of each mixer 80 is then filtered by narrowband bandpass filters, each of one is centered at the oscillation frequency of the corresponding oscillator: bandpass filter 91a is centered at frequency $f_0$, bandpass filter 92a is centered at frequency $f_0 + \Delta f$ and so forth, bandpass filter 99a is centered at frequency $f_0 + (N-1)$. Signals 90a, 91a, ..., 99a are the output signals from the previous bandpass filters. All these signals are combined by an adder circuit 300 whose output signal 110 is delivered to an optical upconverter 320 which works at a centre wavelength $\lambda_{DOWN}$. The optical upconverter 320 output signal 120 is delivered to a Wavelength Division Multiplexers 6, also called WDM.

In upstream direction, the WDM 6 of the DSLAM Line card with xDSL over Fiber Transceiver—Central 2b receives a signal 130. The part of the signal 130 spectrum centered at wavelength $\lambda_{UP}$ is the signal 240 which is the input signal for the xDSL over Fiber transceiver—Central 5 module. Signal 240 is the input signal for an optical downconverter 330 which also works at a centre wavelength $\lambda_{UP}$. The output signal 250 from the optical downconverter 330 can be filtered through a bandpass filter 310 and splitted into N signals. Each signal is filtered by a narrowband bandpass filter, and each of these filters is centered at a different frequency. Bandpass filter 91b is centered at frequency $f_0$, bandpass filter 92b is centered at frequency $f_0+\Delta f$, and so forth, bandpass filter 99b is centered at frequency $f_0+(N-1)$. The output signal of each of these filters is an input signal for a RF downconverter based on a mixer 81. But each mixer 81 uses a different local oscillator. Oscillator 71 generates a carrier at frequency $f_0$, oscillator 72 generates a carrier at frequency $f_0+\Delta f$, and so forth, oscillator 79 generates a carrier at frequency $f_0+(N-1)$. The output of each mixer 81 passes through a low pass filter 60 used to avoid aliasing and the low pass filter output signal 260, shown in FIG. 6, is injected into the corresponding simplified AFE 13b.

Figure 7:
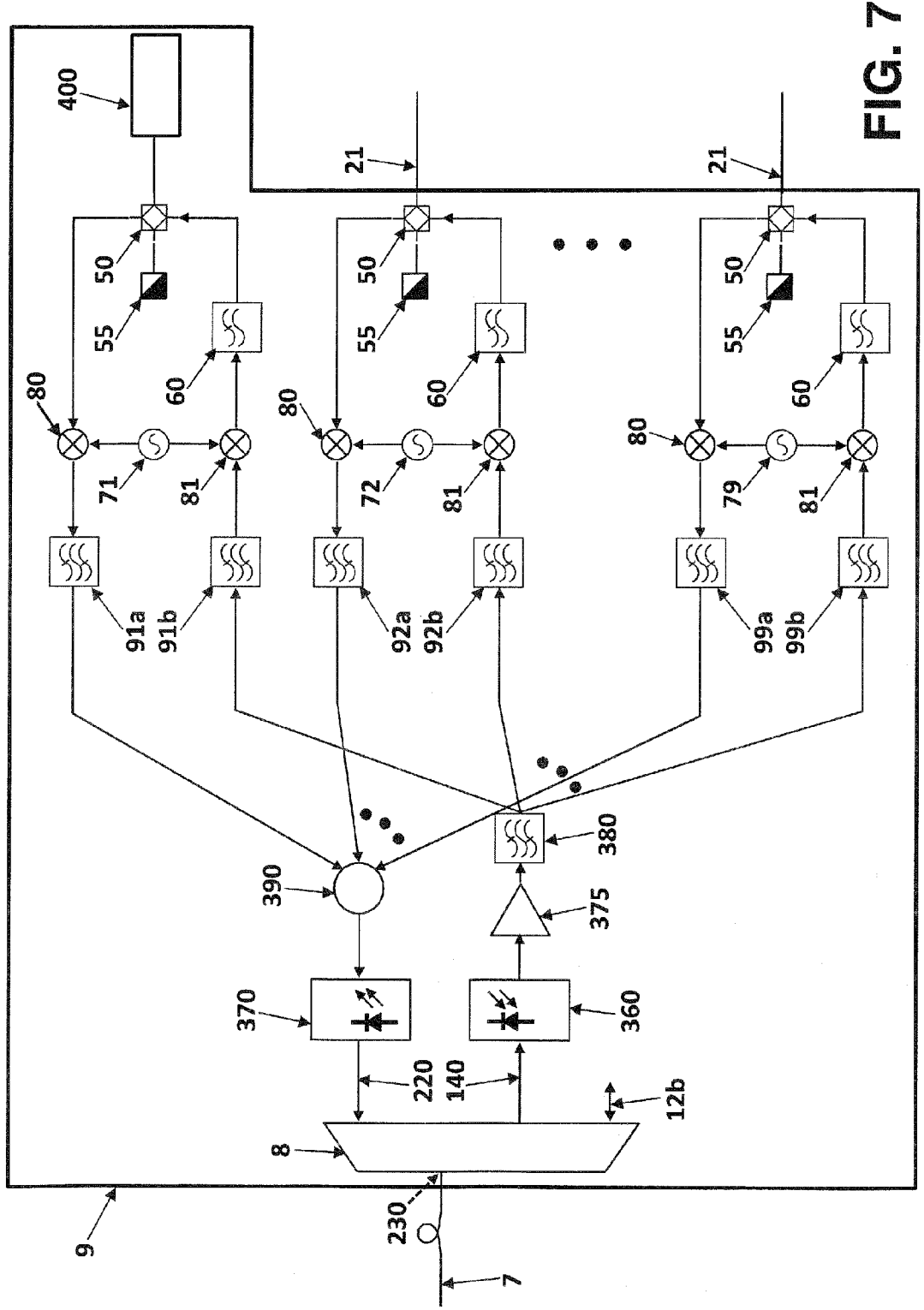
FIG. 7 shows a block diagram of a terminal unit embedded into xDSL over fiber transceiver—remote for remote monitoring.

WDM 6, are used to permit both wavelengths $\lambda_{DOWN}$ and $\lambda_{UP}$ share the same optical fiber 7, as it is shown in FIG. 6 and FIG. 7. In order to keep backward compatibility with other optical signals that share the same fiber link, Wavelength Division Multiplexers are used at both sides of the fiber link allowing the injection and the extraction of optical signals from other services like reflectometry based optical outside plant supervision, GPON or Digital Terrestrial Television (DTT) overlay over GPON/XG-PON enhancement band.

In addition to this, WDM 6 includes an input port 12a to inject optical signals for reflectometry based optical outside plant supervision, and Digital Terrestrial Television (DTT) overlay transport over the GPON/XG-PON enhancement band. This port 12a is also an output port for optical reflectometry signal echoes.

WDM 8 is adjacent to xDSL over Fiber transceiver—Remote 9 and injects into the SMF 7 the upstream multiplex and extracts the downstream multiplex from the SMF 7.

In addition to this, WDM 8 includes an output port 12b to extract the optical signal used to transport Digital Terrestrial Television (DTT) in the GPON/XG-PON enhancement band.

In order to monitor the xDSL over Fiber link status, the system can optionally include an embedded ADSL (or ADSL2+)/VDSL Terminal Unit 400, from now on ATU-R/VTU-R, into the xDSL over Fiber transceiver—Remote 9, as it is shown in FIG. 7. A xDSL Operation, Administration and Maintenance link is established (OAM link) between the corresponding xDSL port 3 at the DSLAM 1 and the embedded ATU-R/VTU-R 400 can be used to monitor the right working of the system, reusing the monitoring facilities supported by xDSL Operation, Administration and Maintenance (OAM) mechanisms, defined in ITU-T Recommendation G.997.1.

As it has been mentioned previously, optical reflectometry signals injected through 12a port can be used for the remote monitoring of the fiber link. But it is not enough. Fiber link can be working correctly, and however, there can be a failure in the system. Establishing a xDSL link between one xDSL port 3 of the line card 2b of the DSLAM 1 at the Central Office 17, and an embedded ATU-R/VTU-R 400 at the xDSL over Fiber transceiver—Remote 9 provides an xDSL OAM link which is used for system monitoring.

The simultaneous usage of multiple optical carrier pairs for multiple xDSL signal multiplex transport provides additional advantages:

More flexibility because all the xDSL ports of the modified xDSL line card 2c can be assigned to different buildings.

This flexibility provided by the new DSLAM line card 2c does not cause more complexity at the customer premises side, because the addition of an Automatic Wavelength Locking (AWL) system 401 into the xDSL over Fiber transceiver—Remote 9 avoids any kind of manual in-field configuration and tuning of the xDSLoF remote transceiver.

This flexibility is even higher when each of the xDSL ports 13b can be dynamically assigned by means of switches 601 controlled by a central control 600 to one or another wavelength pairs.

Figure 8:
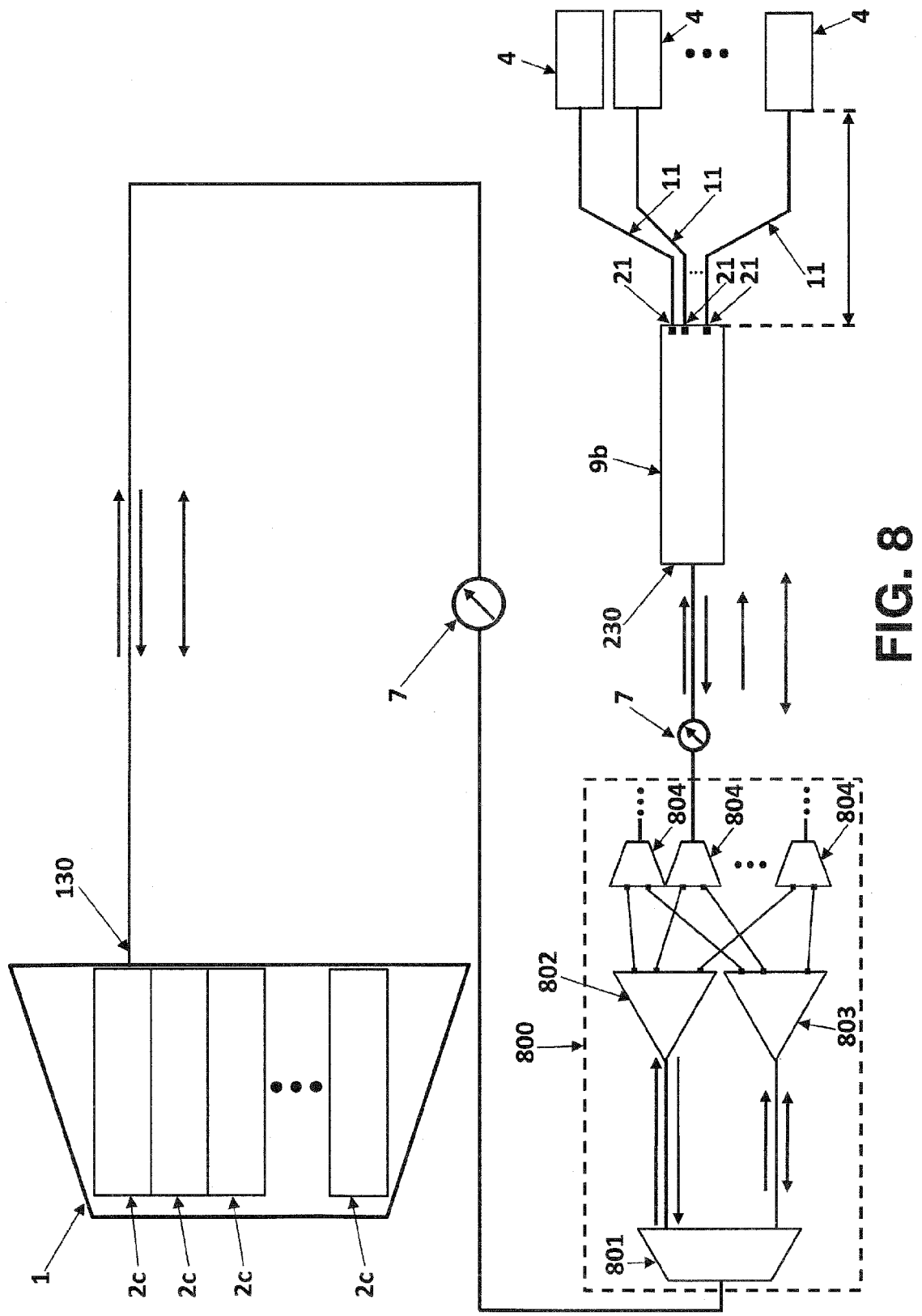
FIG. 8 shows a block diagram including modifications of the data network required to permit the coexistence of several wavelengths.

The invention integrates a plurality of optical modulator/demodulator blocks 401, as it is shown in FIG. 8, into the xDSL DSLAM Line card with xDSLoF transceiver—Central 2b. Thus, a new DSLAM line card 2c is obtained. This new type of DSLAM line card, hereinafter called xDSL DSLAM Line card with tunable xDSLoF transceiver—Central 2c, is capable to transmit and receive simultaneously multiple xDSL signals multiplexes, each of one is transported by a different wavelengths pair ($\lambda_{Di}$ and $\lambda_{Ui}$). So, each wavelengths pair carries a xDSL multiplex, both downstream and upstream, made up from the xDSL signals which correspond to xDSL ports 13b different from the ports associated to the remainder wavelengths pairs.

Each pair of downstream and upstream wavelengths can be used to reach different buildings, and it provides more flexibility although it reduces the coverage due to the passive optical devices required to split the different wavelength pairs. It can be a solution to increase deployment flexibility in cities downtown. The xDSL lines will be dynamically attached to a specific wavelength pair, which will be used to carry all the xDSL signals to all those customers who live in the same building.

In this preferred embodiment, including the introduction of a plurality of optical modulator/demodulator blocks 401 into the DSLAM line cards requires a modification in the passive optical distribution network. This modification is necessary in order to permit the coexistence of several wavelengths for xDSL signals transport with an additional wavelength for digital television distribution and a second additional wavelength for optical outside plant supervision. This modification consists of the block 800 shown in FIG. 8:

A WDM 801, a passive element which splits the optical wavelengths for xDSL multiplex transport from the wavelengths used for Digital Television distribution and for optical outside plant supervision.

An Arrayed Waveguide Grating 802, also called AWG, splits the wavelengths assigned for xDSL multiplex transport to different buildings into different fibers. At each output of the AWG there are only two wavelengths, $\lambda_{Di}$ and $\lambda_{Ui}$, which respectively transport the xDSL downstream and upstream multiplex to those customers who live in the same building.

A passive splitter 803 which equally divides the optical power of the wavelengths used for Digital Television distribution and optical outside plant supervision into as many fibers as buildings are connected to the DSLAM line card.

And a set of WDM couplers 804, which are used to combine at each output fiber the wavelength pair for xDSL signal transport with the two wavelengths used for Digital Television distribution and optical outside plant supervision.

This block 800 introduces approximately an additional attenuation of 8 dB, and it causes a coverage radius decrease in relation to the scenario shown in FIG. 4 using the DSLAM Line card with xDSLoF Transceiver—Central 2b shown in FIG. 6. If this block 800 is not introduced, and the xDSL signals from all the N xDSL ports 13b of the DSLAM line card 2c are carried using a unique wavelengths pair over a unique fiber 7, the maximum reach will be the same than in the case of the solution described in FIG. 6.

Figure 9:
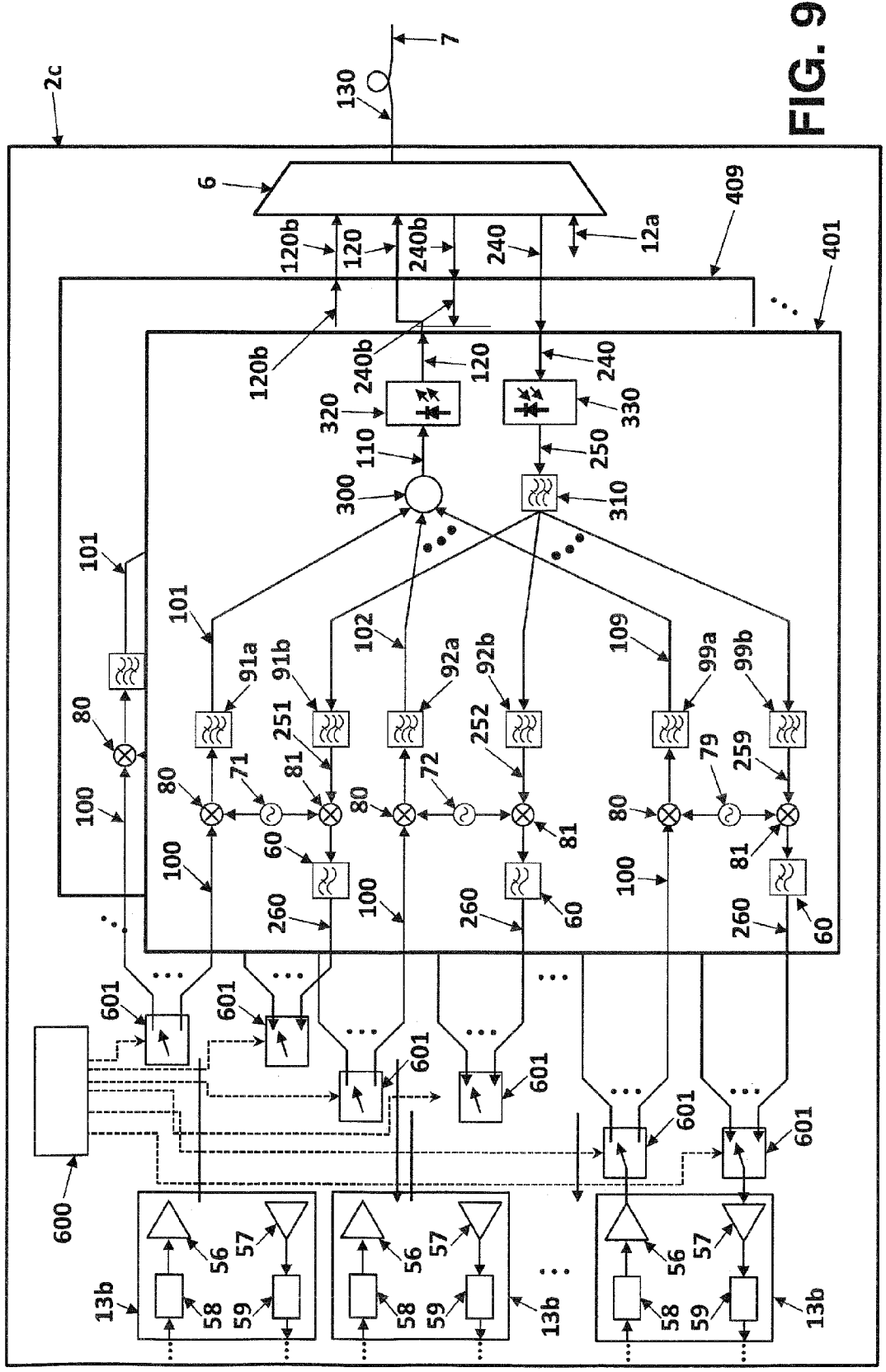
FIG. 9 shows a block diagram of a xDSL DSLAM line card with tunable xDSL over fiber transceiver—central.

The xDSL DSLAM line card with tunable xDSLoF transceiver—Central 2c, described in FIG. 9, adds multiple optical modulators/demodulators blocks 401, switches 601 and a switch control module 600 into the previous xDSL DSLAM Line card with xDSLoF transceiver—Central 2b shown in FIG. 6. The switches 601 permit the dynamic assignment of each of the N xDSL ports 13b to one of the M wavelength pairs. The switch control 600 implements the required logic to control these switches 601.

Apart from the injection of optical carriers for Digital Television (e.g. Digital Terrestrial Television or DTT) distribution and optical outside plan supervision, the input 12a of the WDM multiplexer 6 is used to inject an unmodulated broadband light source $\lambda_{UBLS}$ that after pass through the cyclic AWG 802, will be used by the Automatic Wavelength Locking system 901 of each xDSL over Fiber transceiver—Remote 9b to automatically tune the wavelength of the optical carrier used for upstream transmission.

Figure 10:
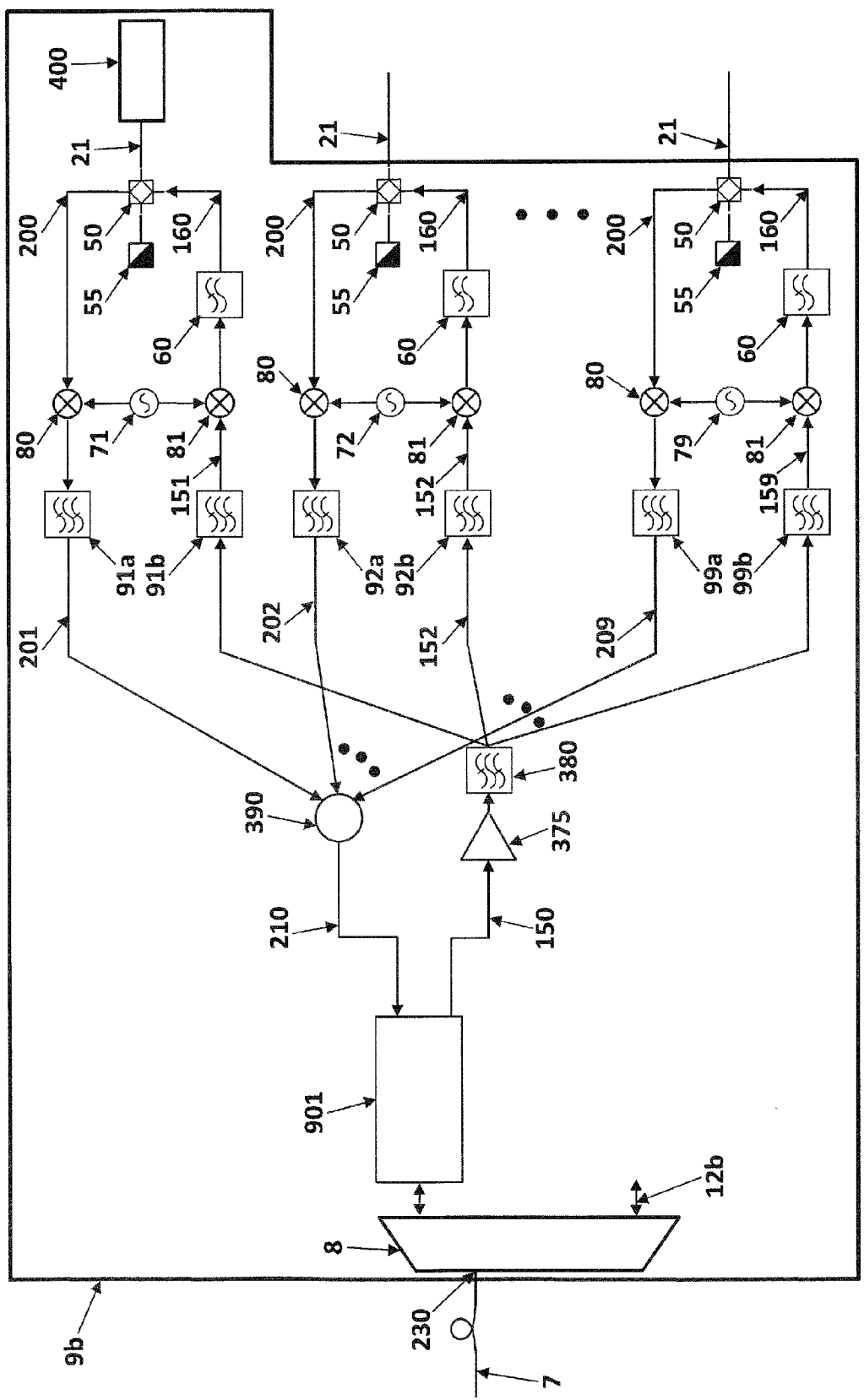
FIG. 10 shows a xDSL over fiber transceiver—remote with an automatic wavelength locking system.

In the customer side it is necessary to add a block which permits an automatic tuning of the assigned wavelengths, avoiding any kind of in-field configuration. This block is an Automatic Wavelength Locking, or AWL, system 901, represented in FIG. 11, like those used in commercial WDM-PON systems, which will be included into the xDSL over fiber transceiver—Remote with an AWL system 9b, as it is shown in FIG. 10. The xDSL over fiber transceiver—Remote with an AWL system 9b is a modified version of the xDSL over fiber transceiver—Remote 9. The modification consists of the substitution of the upconverter 370 of FIG. 7 of the xDSL over fiber transceiver—Remote 9 by the optical transmitter 913 of the AWL system 901 shown in FIG. 11, and the substitution of the downconverter 360, shown in FIG. 7, of the xDSL over fiber transceiver—Remote 9 by the receiver 912 of the AWL system 901 shown in FIG. 11. The xDSL over fiber transceiver—Remote with an AWL system 9b tunes itself automatically to the downstream and upstream wavelengths.

Figure 11:
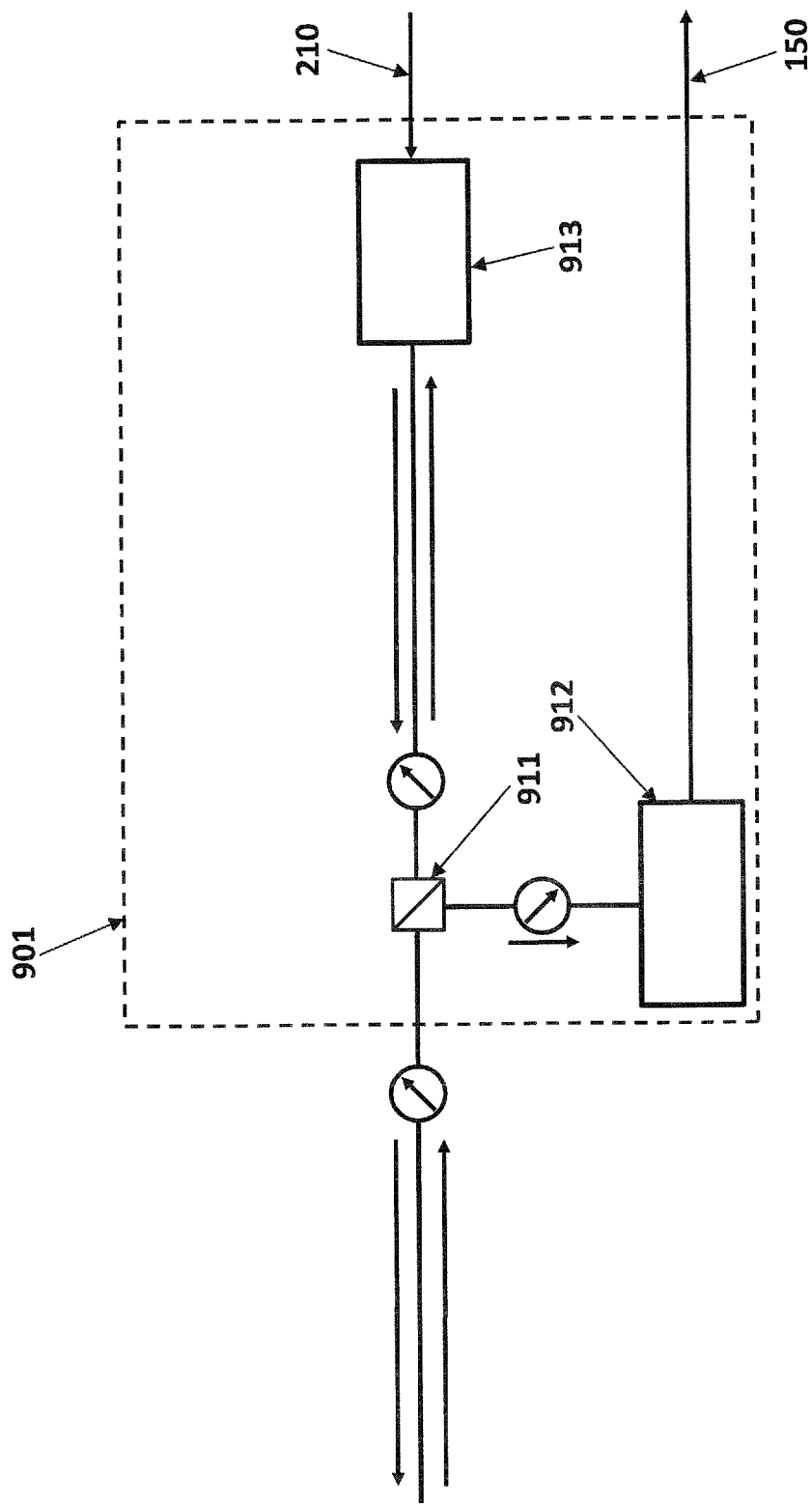
FIG. 11 shows a block diagram of an automatic wavelength locking system.

The Automatic Wavelength Locking system 901 shown in FIG. 11 consists of a dichroic band-splitting filter 911 which splits the incoming optical signals into the optical carrier $\lambda_{Di}$ used for the downstream xDSL multiplex transport and an unmodulated optical carrier $\lambda_{Ui}$ at the same wavelength assigned for the upstream xDSL signal multiplex. The $\lambda_{Di}$ downstream optical carrier is delivered to a Photo Diode based receiver 912 meanwhile the unmodulated $\lambda_{Ui}$ optical carrier is used to tune the Fabry Perot Laser Diode based transmitter 913.

The proposed system is compatible with current xDSL solutions, and it is also fully compatible with current or expected future xDSL improvements like:
Pair bonding (ITU-T G.998.1/G.998.2).
Level 3 Dynamic Spectrum Management (DSM) based on vectoring (ITU-T G.993.5).
Impulse noise protection (ITU-T G.998.4) based on xDSL frames retransmission.

The invention claimed is:
1. System for connecting a plurality of digital subscribers to a data network offering xDSL service, where digital subscribers send analogue upstream signals to the data network and the data network sends digital downstream signals to the digital subscribers, comprising a local part, located at a central office, connected by an optical fiber link to a remote part, located at an intermediate place between the central office and the digital subscribers, and said local part further comprising a plurality of digital subscriber line access multiplexer line cards with xDSL over fiber transceiver (2b), each digital subscriber line access multiplexer line cards with xDSL over fiber transceiver comprising:
    a plurality of xDSL lines comprising:
        in downstream direction:
            an analog front end which comprises an digital-analogue converter (58) to transform a transmitted digital downstream signal into an analogue downstream signal at a original frequency and at least one amplifier;
            an oscillator (80) which fixes an oscillation frequency for the xDSL line;
            a mixer (71), directly connected to the output of the at least one amplifier to convert the analog downstream signal into the oscillation frequency;
            a band pass filter (91a) centred at the oscillation frequency which filters the converted analog downstream signal;
        in upstream direction:
            a band pass filter (91b) centred at the oscillation frequency which filters an analogue upstream signal;
            an oscillator (81) which fixes an oscillation frequency for the xDSL line;
            a mixer (71), directly connected to the output of the band pass filter to convert the analogue donwnstream signal into the original frequency;
            a low pass filter (60) to avoid aliasing;
            an analogue front end which comprises an analogue-digital converter (59) to transform the converted analogue upstream signal into a digital upstream signal, and at least one amplifier;
    an adder circuit (300) to combine the analogue downstream signals received from each xDSL line;
    an optical upconverter (320) centred at a downstream wavelength, receiving upstream signals from the remote part through the wavelength division multiplexer;
    an optical downconverter (330) centred at an upstream wavelength, directly connected to a wavelength division multiplexer;
    a wavelength division multiplexer (6) which is connected through a point to point single model fiber (7) to the remote part.

2. System according to claim 1 wherein the oscillator of each xDSL line fixes an oscillation frequency for each xDSL line higher Δf than the previous one, being Δf:
    Δf>1.014 Mhz when the xDSL line is an ADSL line or ADSL2 line;
    Δf>2.208 MHz when the xDSL line is an ADSL2+ line;
    Δf>30.000 MHz when the xDSL line is a VDSL2 line.

3. System according to claim 2 wherein the remote part further comprising a terminal unit (400), establishing a link between a port (3) at the digital subscriber line access multiplexer (1) and said terminal unit for remote monitoring using monitoring facilities of xDSL Operation, Administration and Maintenance mechanisms.

4. System according to claim 3 further comprising a plurality of switches (601) to assign the xDSL lines to the wavelengths pairs and a switch control (600) module implemented to control said plurality of switches.

5. System according to claim 4 further comprising a block (800) in the data network to transport additional wavelengths, said block comprises:
- a wavelength division multiplexer (801) to split signals with wavelengths for xDSL transport from signals with additional wavelengths;
- a cyclic Arrayed Waveguide Grating (802) connected to the wavelength division multiplexer to deliver the wavelengths for xDSL transport into a plurality of output fibers;
- a passive splitter (803) connected to the wavelength division multiplexer to divide the optical power of the wavelengths used for signals with additional wavelengths into a plurality of output fibers;
- a plurality of wavelength (804) division multiplexer couplers connected to the cyclic Arrayed Waveguided Grating and the passive splitter to combine at each output fiber the signal wavelength pair for xDSL transport with the signals with additional wavelengths.

6. System according to claim 5 wherein the additional wavelengths are a first additional wavelength for digital television distribution and a second additional wavelength for an optical outside plant supervision.

7. System according to claim 5 further comprising in the remote part an Automatic Wavelength Locking module (901) which receives a signal injected in the local part and transmitted through the cyclic Arrayed Waveguide Grating to an automatically tuning of the assigned wavelengths used for the transmission.

8. System according to claim 6 further comprising in the remote part an Automatic Wavelength Locking module (901) which receives a signal injected in the local part and transmitted through the cyclic Arrayed Waveguide Grating to an automatically tuning of the assigned wavelengths used for the transmission.

* * * * *